United States Patent [19]
Oliver

[11] Patent Number: 5,018,794
[45] Date of Patent: May 28, 1991

[54] RALLYE WHEEL HUBCAP RETAINING DEVICE

[75] Inventor: Glenn W. Oliver, 1 Summit Hill Ct. C-4, Catonsville, Md. 21228

[73] Assignee: Glenn W. Oliver, Catonsville, Md.

[21] Appl. No.: 512,521

[22] Filed: Mar. 26, 1990

Related U.S. Application Data

[63] Continuation-in-part of Ser. No. 312,928, Mar. 14, 1989, abandoned.

[51] Int. Cl.$^5$ .............................................. B60B 7/16
[52] U.S. Cl. ................................ 301/37 AT; 301/37 R
[58] Field of Search ............ 301/37 R, 37 AT, 108 R; 70/225, 258, 259

[56] References Cited

U.S. PATENT DOCUMENTS

| | | | |
|---|---|---|---|
| 2,695,191 | 11/1954 | O'Day | 301/108 R |
| 2,874,561 | 2/1959 | Alger | 301/37 AT |
| 4,116,490 | 9/1978 | Huff et al. | 301/37 SS X |
| 4,171,851 | 10/1979 | Scruggs | 301/37 AT |
| 4,193,640 | 3/1980 | Jones | 301/37 AT |
| 4,280,348 | 7/1981 | Teston | 301/37 AT X |
| 4,869,084 | 9/1989 | Mack, Jr. | 301/37 AT X |

*Primary Examiner*—Russell D. Stormer
*Attorney, Agent, or Firm*—Glenn W. Oliver

[57] ABSTRACT

A rallye wheel hub cab retaining device is provided for securing the hub cap to the vehicle's wheel lug, whereby deterring theft of the hub cap. A fixed length of cable is secured to the hub cap on one end by means of four stud terminals, each secured to the existing bolts of the cap. The opposite end, fitted with a loop and "S" hook, is bolted to the wheel lug, and held fast by the wheel lug nut. The relatively simple device secures the hub cap to the wheel, yet still allows enough slack to gain access to the wheel nuts. The device is short enough to safely allow the cap to rotate with the wheel, without striking the vehicle's fender well, should the cap come loose from the rim.

6 Claims, 3 Drawing Sheets

RALLYE WHEEL HUBCAP RETAINING DEVICE

This application is a continuation-in-part of Ser. No. 312,928 filed Mar. 14, 1989, now abandoned.

BACKGROUND OF THE INVENTION

The invention is drawn to a theft deterrent device which prevents unauthorized removal of a rallye wheel hub cap or wheel cover from a vehicle wheel.

The hub cap produced for the rallye wheel is easily stolen and unless protected, is very easy to steal from the vehicle, using only one's hands; no tools are required for removal. It should also be noted that the manufacturer of the rallye wheel hub cap stopped producing them in 1989, thus making them even more scarce, and therefore, more valuable.

There is presently no other device on the market to deter the theft of the rallye wheel hub cap which attaches to the wheel without modifying the hub cap or the wheel.

The prior art demonstrated in this field includes devices which require the alteration or refitting of the hub cap to the wheel in a manner to which is foreign to the manufacturer's original specification. Not only do the alternations or refitting alter the appearance of the hub cap, but in some instances actually change the structure due to welding, heating and drilling of the original cap to accept the after market devices. On some classic or collectible automobiles this is a definite point disadvantage when competing in an auto show.

Other forms of the prior art include devices that incorporate heavy pieces of metal to connect the hub cap to the wheel which, by definition are off-center to the horizontal axis of the wheel, thereby causing the rotating wheel assembly to be out of balance resulting in premature tire wear, not to mention the shaking felt by the operator, due to the out of balance effect.

One form of prior art allows a would-be thief to observe the anti-theft device attached to the hubcap in plain view, thereby allowing the thief to determine which tools are needed to remove the device.

It is a primary object of this invention to provide a device to retain a rallye wheel hub cap without requiring modification of either the wheel or the hub cap.

It is another object of this invention to provide a rallye wheel hub cap theft deterrent device which is low cost, easy to install and weather resistant.

It is a further objection of the invention to provide a device which will be hidden from view inside the hub cap so as to not warn a potential thief.

DETAILED DESCRIPTION

Figure 1:
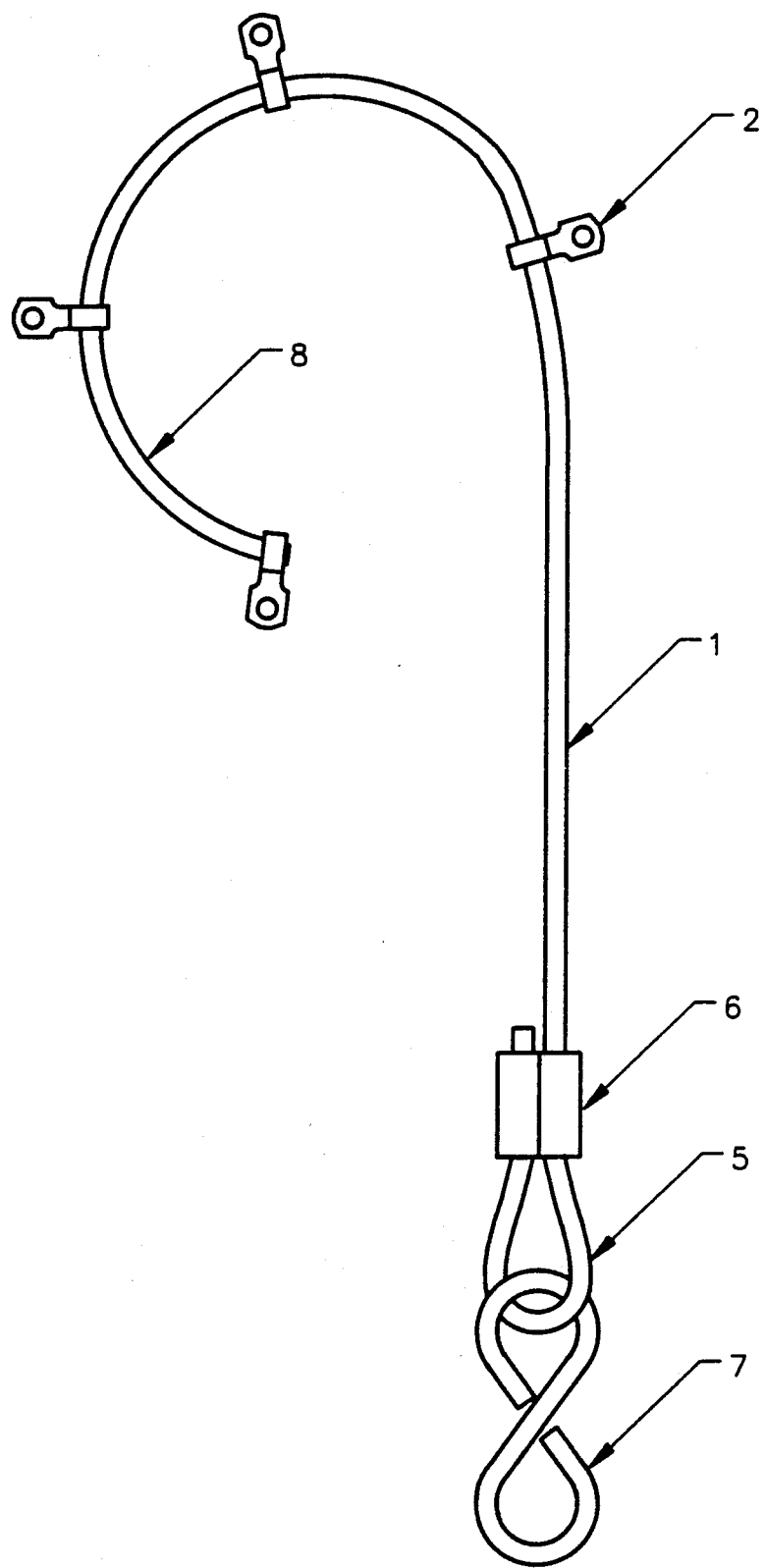
FIG. 1 is a plan view of the theft deterrent device.
Figure 2:
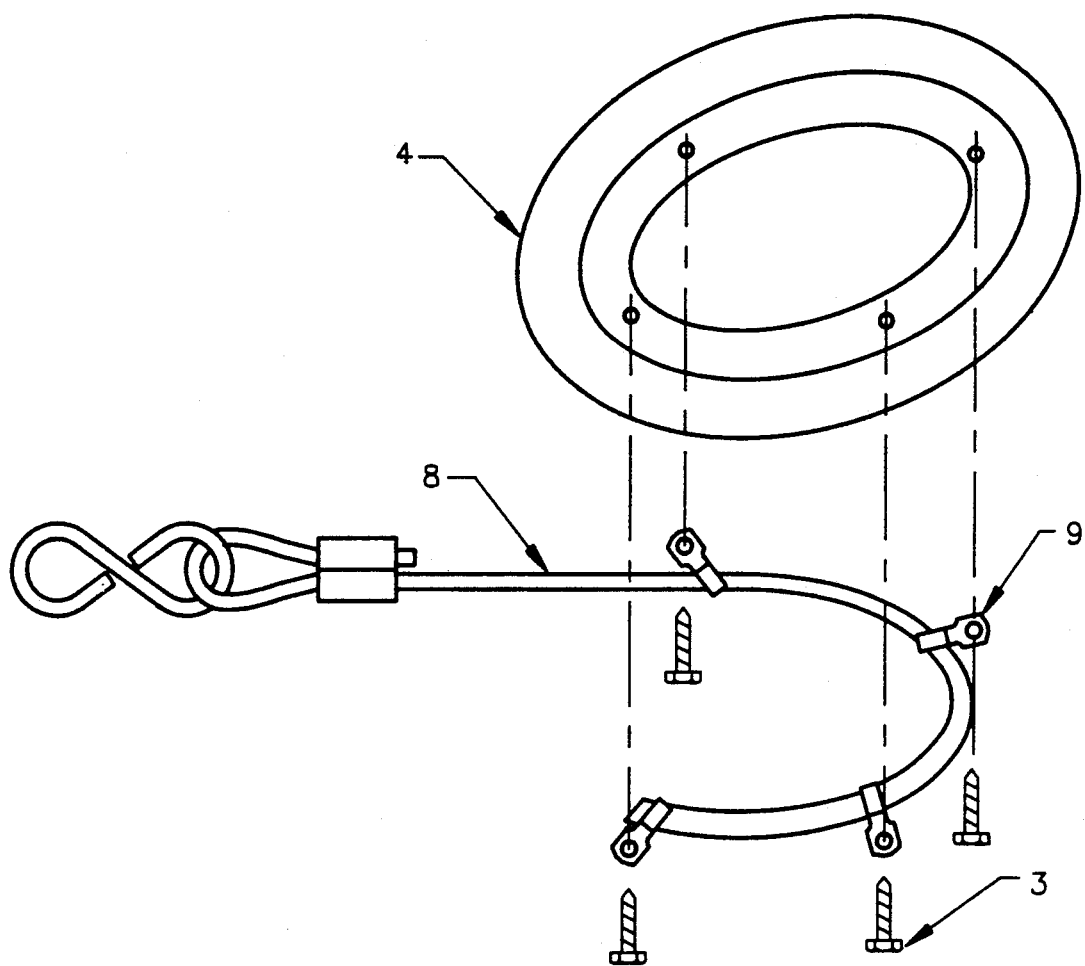
FIG. 2 is an exploded view, showing the mounting surface of the hub cap, the theft deterrent device, in its mounting configuration, and the existing hub cap bolts, shown removed to facilitate installation.

Referring to the drawings, a fixed length of cable 1 is fitted with a plurality of flag terminals 2. Four flag terminals are pressed onto one end of the cable 1 at spaced locations which coincide with the location of the fasteners 3 of the rallye wheel hub cap 4 and shown in FIG. 2. The terminals 2 are aligned such that each terminal is positioned tangentially to the natural cast of the cable 1 to facilitate easy positioning of the device onto the hub cap 4.

A loop 5 is formed from the cable 1 at its other end and secured by a cable ferrule 6 pressed onto the cable 1 to retain the loop 5. A hook 7 is retained on the loop 5 for attachment to one of the lug bolts of the wheel. The loop 5 and thus the theft deterrent device are adapted to be retained by a lug nut fitted onto the lug bolt.

The device is preferably comprised of a ⅛-inch cable; four #8 flag terminals; a ⅛" cable ferrule; and a 1 and ⅜" "S" hook.

Figure 3:
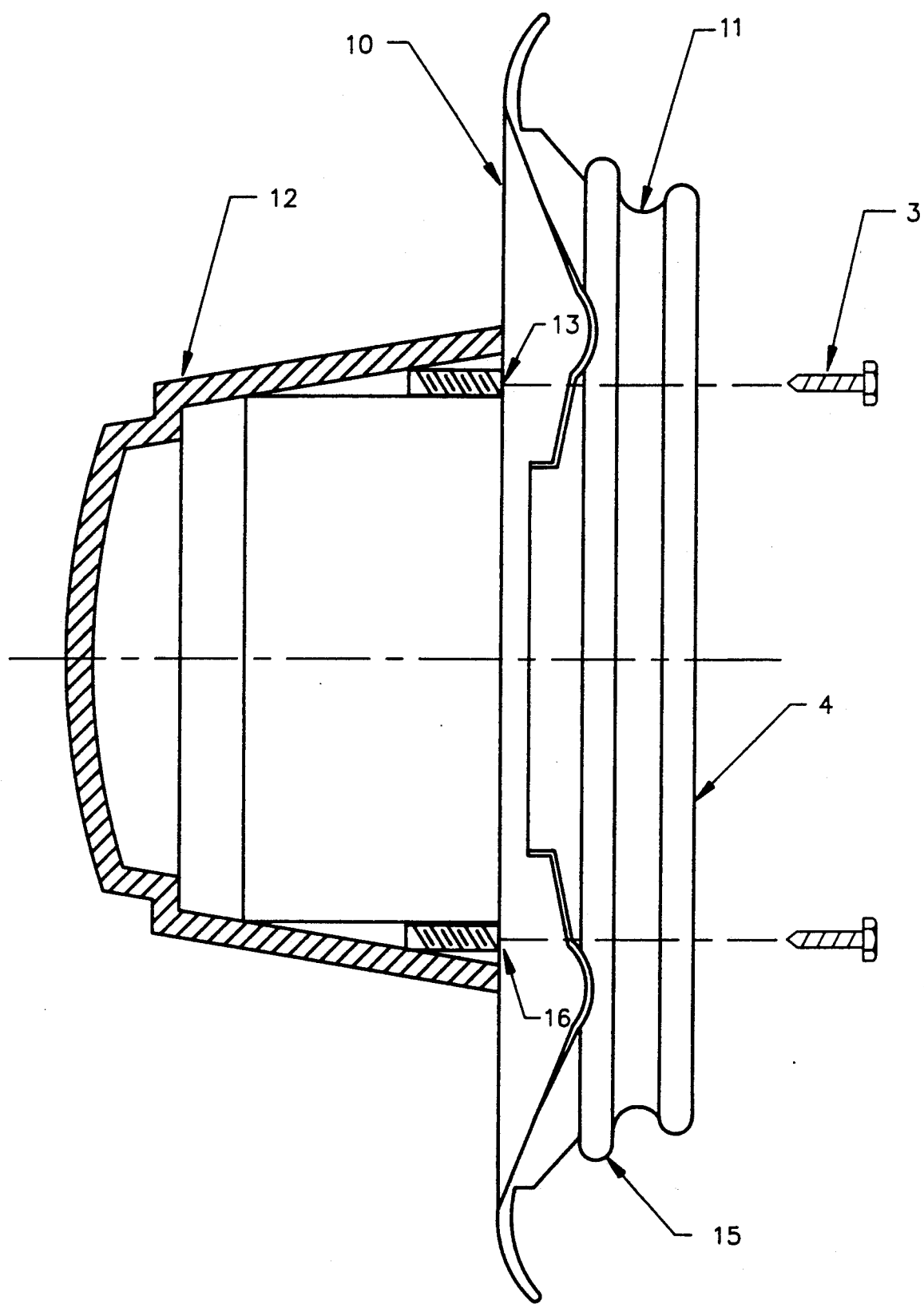
FIG. 3 is a full section view of the rallye wheel hub cap which is standard equipment decoration, and foul weather cover for the rallye wheel. The cap is shown in it's two-piece state prior to being joined together by the four hex head screws.

The standard rallye wheel hub cap 4 is comprised of two main sections as shown in FIG. 3. A cast center cap 12 is joined to a stainless steel outer lock ring 10 by screws 3 which are threaded into holes 13 in the bosses 16 of the hub 12. The bosses 16 act as a base to seat the lock ring 10. The cover is further provided with a weather seal 15 and a locking lip 11.

Installation of the device 8 onto a wheel is accomplished by removing the four existing screws from the back of the hub cap 4, forming the device 8 to accept the curve of the hub cap bolt circle, and installing the screws 3 one at a time, such that the stud holes 9 on the flag terminals face outward of the center of the cap. The other end of the device is attached to the wheel by removing a lug nut, slipping the "S" hook 7 over the lug, and replacing the lug nut. The rallye wheel hub cap is now easily and effectively retained on the wheel and the device is completely hidden from view.

I claim:

1. A wheel cover retaining device comprising:
   an elongated tether means having two ends;
   a first fastening means at a first end of said tether means for fastening said device to a vehicle wheel;
   a plurality of second fastening means adjacent a second end of said tether means and arranged in a spaced relationship along said tether means to coincide with existing fastening means on said wheel cover;
   whereby said tether means is adapted to be secured to said wheel cover by said existing fastening means.

2. The wheel retaining device according to claim 1 wherein said first fastening means is a hook member secured to the first end of said tether means and is adapted to be secured to the lug bolt of a vehicle wheel.

3. The wheel cover retaining device of claim 1 wherein said existing fastening means comprises a plurality of removable fastening members;
   and said second fastening means comprises a plurality of flag terminal members having a hole therethrough to receive said removable fastening members.

4. The wheel cover retaining device of claim 1 wherein said tether means comprises a cable.

5. The wheel cover retaining device of claim 1 wherein said wheel cover is a hub cap adapted for use on a rallye wheel.

6. The wheel cover retaining device of claim 2 wherein said hook member is attached to said tether means through a loop formed at the first end of said tether means.

* * * * *